United States Patent [19]
Walter

[11] Patent Number: 4,883,084
[45] Date of Patent: Nov. 28, 1989

[54] PRESSURE FLUID CONTROL SYSTEM

[75] Inventor: David T. Walter, Milton Keynes, England

[73] Assignee: TI Interlock Limited, Bedford, England

[21] Appl. No.: 221,855

[22] Filed: Jul. 20, 1988

[30] Foreign Application Priority Data

Jul. 21, 1987 [GB] United Kingdom ............... 8717169

[51] Int. Cl.⁴ .................................................. F16K 31/36
[52] U.S. Cl. .................................... 137/118; 137/488
[58] Field of Search ............... 137/115, 118, 488, 102

[56] References Cited

U.S. PATENT DOCUMENTS

| | | | |
|---|---|---|---|
| 3,858,598 | 1/1975 | Carmen et al. | 137/102 |
| 4,210,165 | 7/1980 | Kitsugi | 137/102 |
| 4,597,407 | 7/1986 | Smith | 137/115 |

FOREIGN PATENT DOCUMENTS

| | | | |
|---|---|---|---|
| 0219938 | 4/1987 | European Pat. Off. | |
| 673849 | 1/1930 | France | 137/488 |
| 2260704 | 9/1975 | France | 137/115 |
| 520800 | 5/1940 | United Kingdom | 137/115 |

Primary Examiner—Stephen M. Hepperle
Attorney, Agent, or Firm—Seidel, Gonda, Lavorgna & Monaco

[57] ABSTRACT

The supply of a pressure fluid to one or more outlets additional to a permanent outlet is controlled by the provision for the or each additional outlet of a pressure fluid circuit including sources of higher and lower reference pressure fluids and three comparator valves using the reference pressure fluids and the pressure fluid to connect the pressure fluid to the additional outlet when the pressure fluid pressure exceeds the higher reference pressure and to disconnect the pressure fluid from the additional outlet when the pressure fluid pressure falls below the lower reference pressure.

10 Claims, 3 Drawing Sheets

PRESSURE FLUID CONTROL SYSTEM

FIELD OF THE INVENTION

The invention relates to a control system for control of a pressure fluid.

BACKGROUND OF THE INVENTION

There are various applications in which a plurality of pressure fluid actuators are required to co-operate to apply an optimum control pressure, for example, in clutch or brake systems, as used in the paper converting industry. A multi-range facility can be obtained by provision for manual selection of a desired number of actuators, to obtain optimum control. It would however be advantageous to provide a condition responsive control system for use in particular where control arrangements cannot be readily accessible, or where frequent changes are required.

It is accordingly an object of the invention to provide a system for controlling communication of pressure fluid to one or more of a plurality of outlets in dependence on the pressure of the fluid.

It is also an object of the invention to provide such a system which operates solely by means of pressure fluid.

It is a further object of the invention to provide a system for controlling the condition of a valve communicating a pressure fluid source with an outlet in response to the valve of the pressure of the pressure fluid as compared with one or more reference pressures.

It is an additional object of the invention to provide a control system for a plurality of fluid outlets, whereby the outlets are opened or closed to supply or cease to supply a pressure fluid in response to predetermined fluid pressure conditions in a predetermined order.

SUMMARY OF THE INVENTION

The invention accordingly provides a pressure fluid control system for controlling supply of a pressure fluid to at least one outlet additional to a first outlet, in dependence on the level of the control pressure.

The invention conveniently employs only pressure fluids and can then provide such a system in which a control pressure supplied to a first output is compared with a reference pressure, the result of the comparison determining whether or not the control pressure is supplied also to a second outlet. A rising control pressure can be compared with a high reference pressure, and on exceeding it, effects valve movement whereby the control pressure is communicated to the second outlet, and the comparison maintained, but against a lower reference pressure. If the control pressure falls below the lower reference pressure, a contrary valve movement ensues whereby the second outlet is connected to exhaust and the control pressure comparison continued, but against the higher reference pressure.

The invention can also provide such a system having a plurality of the additional outlets, in which means is provided to effect the connection of control pressure to the outlets, and its disconnection from them, in a predetermined order.

BRIEF DESCRIPTION OF THE DRAWINGS

The invention is further described below, by way of example, with reference to the accompanying drawings, in which:

FIGS. 2 and 2a show alternate embodiments of the invention shown in FIG. 1 and 1a.

DETAILED DESCRIPTION OF THE DRAWINGS

Figure 1:
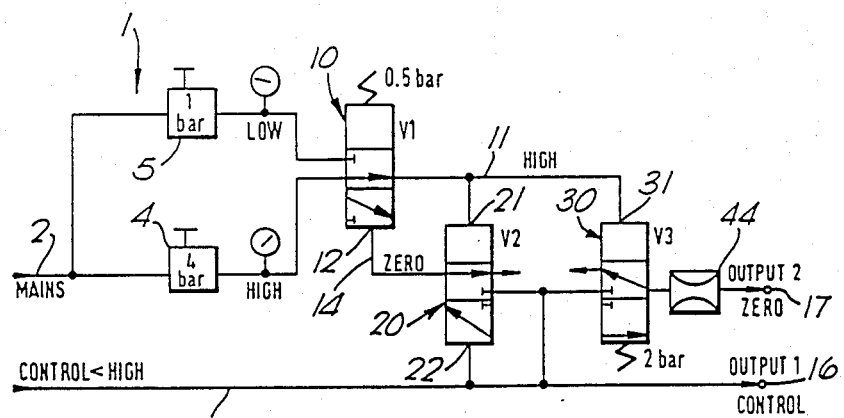
FIGS. 1 and 1a schematically show the circuit of a modified control system, in which pneumatic pressure supply to three outputs is controlled.
Figure 1A:
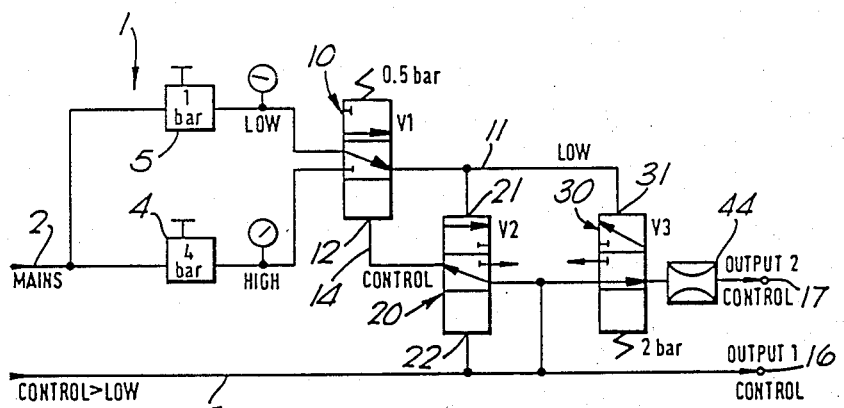

Referring to the pneumatic control system 1 of FIGS. 1 and 1a, an uncontrolled pneumatic mains pressure line 2 communicates to regulators 4,5 which establish a high and a low reference pressure, respectively. The high and low reference pressures may for example be four bar and one bar. The high and low reference pressures can be otherwise related, but the high pressure must be appropriately lower than the minimum mains pressure, say, by about one bar, and the low reference pressure must exceed zero by a suitable amount, say, about one bar. The low reference pressure must also be below half the high reference pressure.

The two reference pressures are taken to a first comparator valve 10 so that one or the other can appear on the valve output line 11. One comparison port of the valve 10 communicates with a second valve comparator valve 20 and is opposed by a spring force less than the lower reference pressure, say 0.5 bar.

One comparison port 21 of the valve 20 is connected to the output line 11 of the valve 10 and the other comparison port 22 connects to a control pressure, which may be derived from the pneumatic mains supply, on a control line 15 which extends to a first circuit outlet 16. Outlet 16 is connected to equipment to be pneumatically operated, for example, to one or more of the brake assemblies of a brake device of the kind disclosed in EP-A No. 1-0 219 938 and the pressure of the fluid on the line 15 is controlled by means (not shown) in response to sensed experience of the equipment. The control line 15 is also connected to the valve 20 so that in one position of this valve control pressure is taken through the valve to the line 14 and thus to the comparison port 12 of the valve 10. In the other position of the valve 20 line 14 is connected to exhaust or zero pressure.

The control line pressure can also be supplied to a second circuit outlet 17 through a third comparator valve 30 in one position of this valve. The outlet 17 is connected to the equipment, for example, to additional brake assemblies of the brake device of EP-A No. 1-0 219 938. In the other position of the valve 30, it connects the outlet 17 to exhaust. One comparison port 31 of the valve 30 is connected to the output line 11 of the valve 10 and this is opposed by a spring force equivalent to a pressure between the high and low reference pressures, say, 2 bar.

Initially, on switching the system on, the control pressure on line 15 is low, that is, below the high reference pressure. The valve 10 applies high reference pressure to the valves 20 and 30.

FIG. 1 shows a condition of the system when control pressure is low, that is, below high reference pressure. The valve 20 is consequently at a position in which control pressure is not applied to the comparison port 12 of valve 10, which is instead at zero or exhaust. High pressure is communicated to valve 30, so holding outlet 17 disconnected from the control pressure.

If the control pressure rises, so as to exceed the high reference pressure, the position of valve 20 will alter, so that the control pressure is applied to the comparison port 12 of valve 10, so that this shifts also, to apply low reference pressure to valve 30, as well as to valve 20. Valve 30 consequently also moves and control pressure is applied to the second circuit output 17. The position then is as shown in FIG. 1a.

This condition will be maintained as long as the control pressure remains above the low reference pressure.

If the control pressure drops below the low reference pressure, valve 20 will move back to the position of FIG. 1, so that comparison port 12 of valve 10 is connected to exhaust. This in turn effects movement of valve 10 back to the FIG. 1 position, in which high reference pressure is applied to the comparison ports 21 and 31. Valve 30 consequently moves to disconnect circuit outlet 17 from the control pressure line 15 and to connect it to exhaust. Thus the condition of FIG. 1 has been restored.

Figure 2:
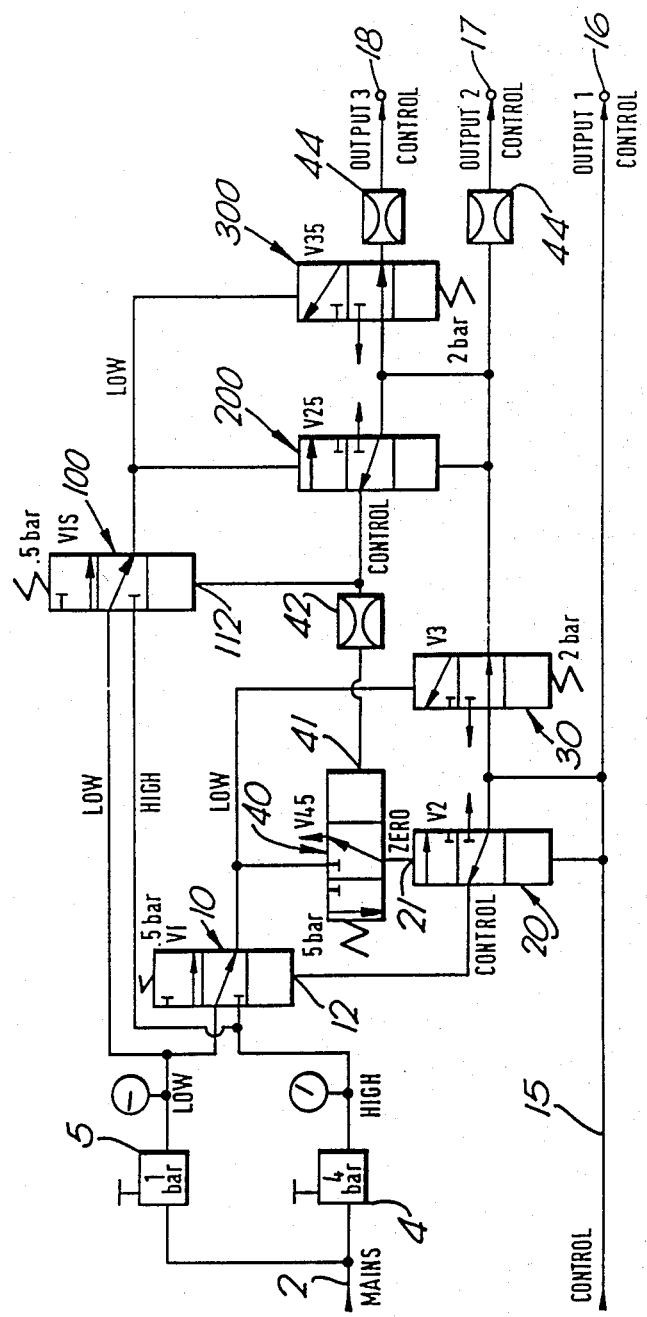
Figure 2A:
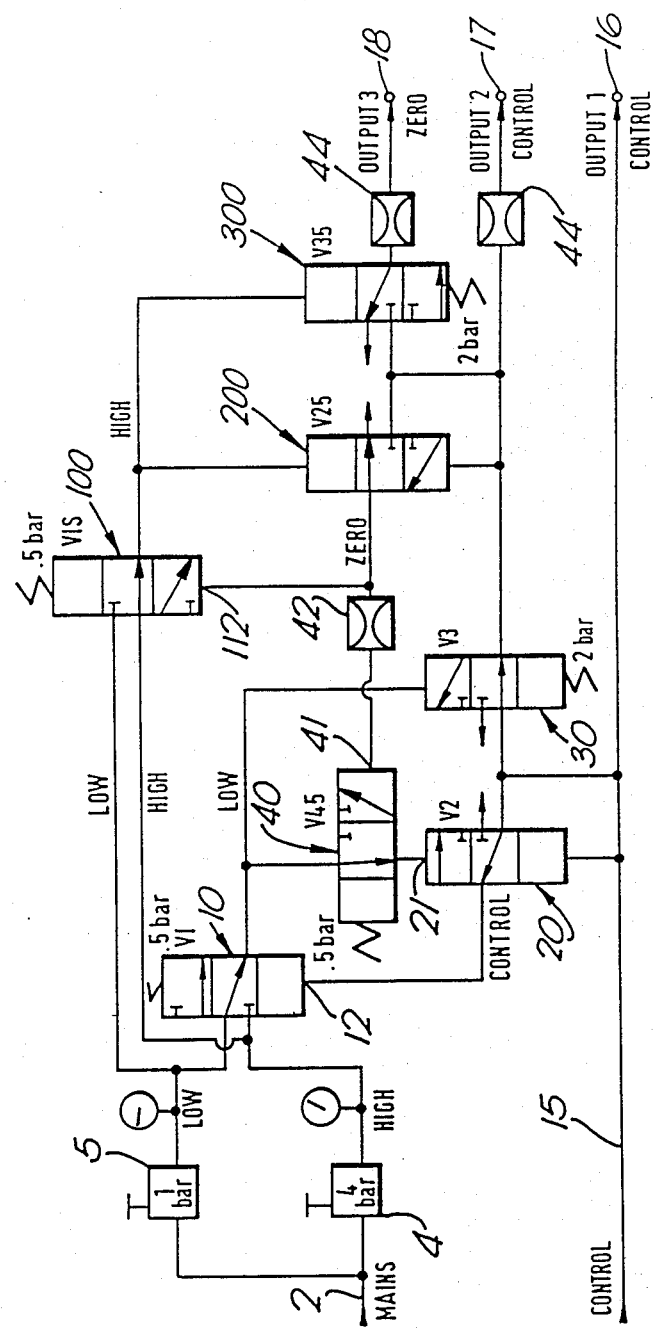

The system of FIGS. 1 and 1a controls only one additional output, but can be modified to control as many other additional outputs as may be required. Such modification appears from the circuit of FIGS. 2 and 2a, in which a third output is similarly controlled. In FIGS. 2 and 2a, parts equivalent to those shown in FIGS. 1 and 1a are identified by the same references.

Besides the outlets 16 and 17, the circuit of FIGS. 2 and 2a has a third outlet 18. It will be seen that the control of the additional outlet 18 requires the addition of three extra valves 100, 200 and 300 which operate in essentially the same way as the valves 10, 20 and 30, together with the addition of a fourth additional comparator valve 40.

The valve 40 is placed in the line communicating the reference pressure, conveyed through valve 10, to the comparison port 21 of valve 20, and functions either to convey that pressure to the port or to connect the port to exhaust. The valve 40 has a comparator port 41 connected to the line connecting the comparator port 112 of valve 100 (equivalent to the port 12 of valve 10) to the valve 200, and this is opposed by a spring force equivalent to a pressure below low reference pressure, say, 0.5 bar.

In the position of FIG. 2, the valves 10, 20 and 30 are in the position of FIG. 1a, so the control pressure is supplied to outlet 17, and through valve 200, to the comparison port of valve 40, keeping this in position to exhaust port 21 of valve 20. Thus, valve 200 compares control pressure with low, but valve 20 compares it with zero. Consequently, if control pressure drops, to below the low reference pressure, valve 200 will operate before valve 20.

Operation of valve 200 connects the comparison ports of valves 100 and 40 to exhaust, so valve 100 operates to transmit high reference pressure to the comparison ports of valves 200 and 300, with the result that valve 300 connects outlet 18 to exhaust, although control pressure is still applied to outlet 17. A preset or adjustable restrictor 42 retards the fall to zero of the pressure at the comparison port 41 of the valve 40 to allow time for readjustment of control pressure in response to the reduction in the effective output, but as soon as the pressure at port 41 falls below 0.5 bar, valve 40 shifts to transmit low reference pressure to the valve 20. This position is illustrated in FIG. 2a, in which a further drop in control pressure will result in connection of output 17 also to exhaust.

The configuration of FIGS. 2 and 2a thus ensures that the second and third outlets 17 and 18 are connected to control pressure or disconnected from it in appropriate order, so that outlet 17 is not connected to exhaust before outlet 18.

Restrictors 44, preferably adjustable, is advantageously fitted to the or each output line other than that to the first outlet 16, to prevent sudden changes and to allow the control system to adjust the control pressure.

Although pneumatic systems only have been illustrated and described, it will be evident that the systems can be readily modified to deal with hydraulic pressure fluids, by means of necessary changes, for example, to provide for connection of the exhaust outlets of valves 20 and 30 to a hydraulic return line or sump.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A control system for controlling connection of a pressure fluid source to an outlet at a condition responsive pressure, the system comprising: comparator means adapted to provide an output dependent on a comparison of the pressure of the pressure fluid with a greater or lesser reference pressure, said greater and lesser reference pressure being provided as fluid pressures, and an output valve responsive to said comparator output to connect said pressure fluid source to said outlet when said pressure fluid pressure exceeds said higher reference pressure and to disconnect said pressure fluid source from said outlet when said pressure fluid pressure falls below said lower referenced pressure, said comparator means comprising a comparator valve responsive to the pressure fluid and to one or other of said greater or lesser reference pressure fluids to control said output valve.

2. The control system of claim 1 wherein said output valve is a second comparator valve having a comparison port opposed by a spring bias, and wherein said first-mentioned comparator valve controls said second comparator valve by effecting the supply to said comparison port thereof either said higher or said lower reference pressure fluid.

3. The control system of claim 2 further comprising a third comparator valve having a comparison port opposed by a spring bias, and wherein said first-mentioned comparator valve operates said third comparator valve to supply to said output valve comparison port either said higher or said lower reference pressure fluid by connecting said comparison port either to zero pressure or to said fluid pressure.

4. The control system of claim 1 further comprising a second outlet permanently connected to said pressure fluid.

5. The control system of claim 1 further comprising regulator means adapted to establish said higher and lower fluid pressures from an uncontrolled mains fluid pressure line.

6. A fluid pressure control system in a pressure fluid circuit comprising: first, second and third comparator valves, said first and third comparator valves each having a comparison port opposed by a fixed bias, said second comparator valve having two comparison ports; first, second and third sources respectively of fluid at a higher reference pressure, fluid at a lower reference pressure and fluid at a condition responsive variable pressure; and a system outlet for said fluid from said third source, said first comparator valve having first and second positions respectively connecting said first and said second source with a comparison port of said second comparator valve and with said comparison port of said third comparator valve, said second comparator valve having a first position when said first comparator valve is in the first position thereof connecting said comparison port of said first comparator valve with zero pressure, and a second position when said first comparator valve is in the second position thereof connecting said comparison port with said third source, and said third comparator valve having a first position when said first and second comparator valves are in the first positions thereof connecting said system outlet to zero pressure and a second position when said first and second comparator valves are in the second positions thereof connecting said system outlet to said third source.

7. The control system of claim 6 wherein said system is a pneumatic system, said higher and lower reference pressures are about 4 bar and 1 bar, and said first and third valve biasses are about 0.5 bar and 2 bar respectively.

8. The control system of claim 6 wherein said pressure fluid circuit further comprises a second system outlet, and fourth, fifth, and sixth comparator valves, said fourth, fifth and sixth comparator valves controlling connection of said third source to said second system outlet in the same way as said first, second and third comparator valves control connection of said third source to said first-mentioned system outlet.

9. The control system of claim 6 having a restrictor located upstream of said system outlet.

10. The control system of claim 6 wherein said fluid circuit further comprises a second outlet and means permanently connecting said third source to said second outlet.

* * * * *